（12）United States Patent
Robertsson et al.

(10) Patent No.: US 8,750,073 B2
(45) Date of Patent: Jun. 10, 2014

(54) SEISMIC DATA ACQUISITION AND SOURCE-SIDE DERIVATIVES GENERATION AND APPLICATION

(71) Applicant: Westerngeco L.L.C., Houston, TX (US)

(72) Inventors: Johan O. A. Robertsson, Guantchester (GB); Dirk-Jan van Manen, Redhill (GB); David Fraser Halliday, Cherry Hinton (GB); Robert Montgomery Laws, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/710,149

(22) Filed: Dec. 10, 2012

(65) Prior Publication Data

US 2013/0100762 A1 Apr. 25, 2013

Related U.S. Application Data

(60) Division of application No. 13/218,881, filed on Aug. 26, 2011, now Pat. No. 8,331,192, which is a continuation of application No. 13/011,832, filed on Jan. 21, 2011, now Pat. No. 8,203,906, which is a division of application No. 12/340,625, filed on Dec. 19, 2008, now Pat. No. 7,876,642, which is a division of application No. 11/459,441, filed on Jul. 24, 2006, now Pat. No. 7,492,665.

(51) Int. Cl.
*G01V 1/00* (2006.01)

(52) U.S. Cl.
USPC .......................................................... 367/21

(58) Field of Classification Search
USPC ............................................... 367/21, 20, 23
See application file for complete search history.

(56) References Cited

U.S. PATENT DOCUMENTS

| 4,168,485 | A | | 9/1979 | Payton et al. |
| 4,686,654 | A | | 8/1987 | Savit |
| 5,392,213 | A | * | 2/1995 | Houston et al. .................. 702/17 |

(Continued)

FOREIGN PATENT DOCUMENTS

| EP | 0519810 | 12/1992 |
| FR | 2338499 | 8/1977 |
| WO | 8906562 | 7/1987 |
| WO | 03087878 | 10/2003 |

OTHER PUBLICATIONS

Extended Search Report of European Application Serial No. 11185739.7 dated Feb. 14, 2012.

(Continued)

*Primary Examiner* — Mark Hellner

(57) ABSTRACT

The technologies described herein include systems and methods for performing a first seismic survey and performing a second seismic survey after a predetermined amount of time has lapsed between the first seismic survey and the second seismic survey. The shot times and the shot positions of the second seismic survey may be substantially the same as the shot times and the shot positions of the first seismic survey. After performing the seismic surveys, seismic data generated by the first seismic survey may be processed to generate a first image, and seismic data generated by the second seismic survey may be processed to generate a second image. After generating the first and second images, a difference between the first image and the second image may be computed to generate a time lapse difference image.

10 Claims, 12 Drawing Sheets

(56) References Cited

U.S. PATENT DOCUMENTS

| | | | |
|---|---|---|---|
| 5,761,152 | A | 6/1998 | Jacobsen et al. |
| 5,924,049 | A | 7/1999 | Beasley et al. |
| 6,041,018 | A | 3/2000 | Roche |
| 6,438,069 | B1 | 8/2002 | Ross et al. |
| 6,545,944 | B2 * | 4/2003 | de Kok ............... 367/56 |
| 6,556,510 | B2 | 4/2003 | Ambs |
| 6,574,563 | B1 | 6/2003 | Nickel |
| 6,671,223 | B2 | 12/2003 | Bittleston |
| 6,684,160 | B1 | 1/2004 | Ozbek et al. |
| 6,738,715 | B2 | 5/2004 | Shatilo et al. |
| 6,882,938 | B2 | 4/2005 | Vaage et al. |
| 6,906,981 | B2 * | 6/2005 | Vaage ............... 367/21 |
| 6,906,982 | B2 | 6/2005 | Calvert |
| 7,003,402 | B2 | 2/2006 | Christie et al. |
| 7,050,355 | B2 | 5/2006 | Robertsson et al. |
| 7,068,568 | B2 | 6/2006 | Robertsson |
| 7,433,265 | B2 | 10/2008 | Craft et al. |
| 7,492,665 | B2 | 2/2009 | Robertsson et al. |
| 7,876,642 | B2 | 1/2011 | Robertsson et al. |
| 8,014,229 | B2 | 9/2011 | Meunier et al. |
| 8,203,906 | B2 | 6/2012 | Robertsson et al. |
| 8,331,192 | B2 | 12/2012 | Robertsson et al. |
| 2002/0181328 | A1 | 12/2002 | de Kok |
| 2004/0013037 | A1 | 1/2004 | Vaage |
| 2005/0073910 | A1 | 4/2005 | Cole et al. |
| 2009/0073805 | A1 | 3/2009 | Tulett et al. |
| 2011/0110188 | A1 | 5/2011 | Robertsson et al. |

OTHER PUBLICATIONS

Johnston, "OTC 8289: A Tutorial on Time-Lapse Seismic Reservoir Monitoring," 1997 Offshore Technology Conference, 1997: pp. 141-146.

Examination Report of European Application Serial No. 07812382.5 dated Sep. 1, 2009.

Feldman, "Appendix D: Derivation of the Spectral Efficiency Form of Shannon's Capacity Formula," Emerging Commercial Mobile Wireless Technology and Standards: Suitable for Army?, Washington, D.C.: Rand, 1998: p. 75.

Unknown, CDMA Technology, Dec. 2005: pp. 1-7, <http://www.tsp.ece.mcgill.ca/Telecom/Docs/cdma.html>.

Ziolkowski, "The determination of the far-field signature of an interacting array of marine seismic sources from near-field measurements—results from the Delft Air Gun Experiment," First Break, Jan. 1987, vol. 5(1): pp. 15-29.

Mozeson et al., "Diverse Radar Pulse-Train with Favourable Autocorrelation and Ambiguity Functions," Radar, Oct. 2002: pp. 172-176.

Unknown, "High Resolution of Streamer Seismic Data," PGS GEophysical, Sep. 2005, vol. 5(8): pp. 1-4.

Fan et al., "Chapter 15: Optical Orthogonal Sequences," Sequence Design for Communications Applications, Baldock: Research Studies Press Ltd., Jun. 1996: pp. 369-396.

Hale, "Q-adaptive deconvolution," Stanford Exploration Project Report, 1982: pp. 133-158, <http://sepwww.stanford.edu/data/media/public/oldreports/sep30/30_11.pdf>.

Grønaas et al., "Simultaneous acquisition with impulsive marine seismic sources," Schlumberger, Aug. 2000: pp. 1-27.

Unknown, "IAGC Statement of Principle for Ethical Conduct in Negotiations," International Association of Geophysical Contractors, Mar. 2003: pp. 1-2.

Unknown, "IAGC Statement of Principles: Intellectual Property (IP)," International Association of Geophysical Contractors, 2005: pp. 1-5.

Mokhtar et al., "Three-level Code Division Multiplex for Local Area Networks," Proc. of ONDM 2004, 2004: pp. 401-410.

Examination Report of European Patent Application No. 09172688.5 dated Oct. 6, 2010.

Extended Search Report of European Patent Application No. 09172688.5 dated Feb. 15, 2010.

International Search Report and Written Opinion of PCT Application No. PCT/US2007/072262 dated Feb. 26, 2008.

Extended Search Report of European Application No. 11185733.0 dated Feb. 13, 2012.

* cited by examiner

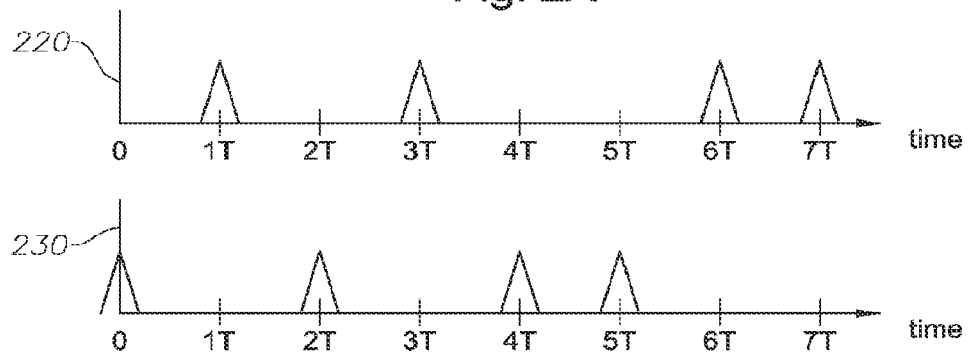
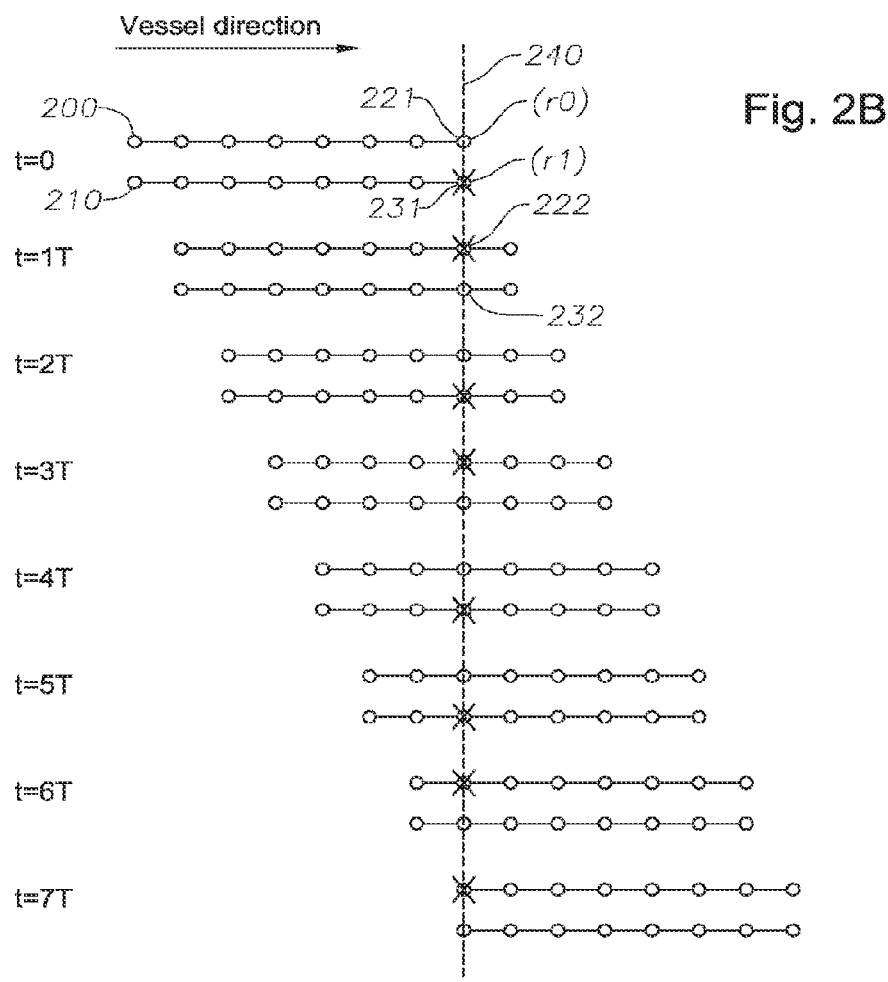

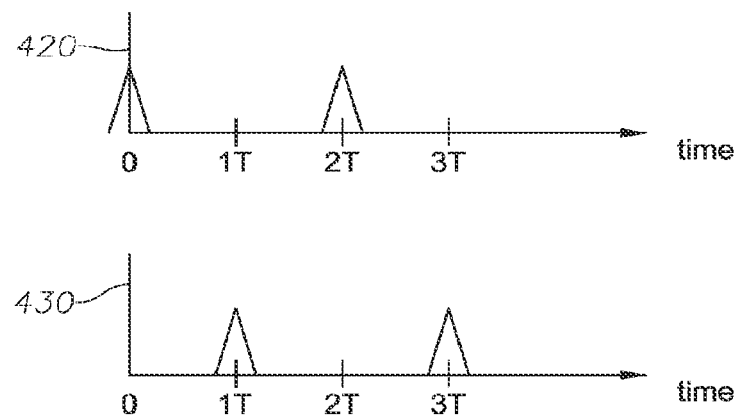
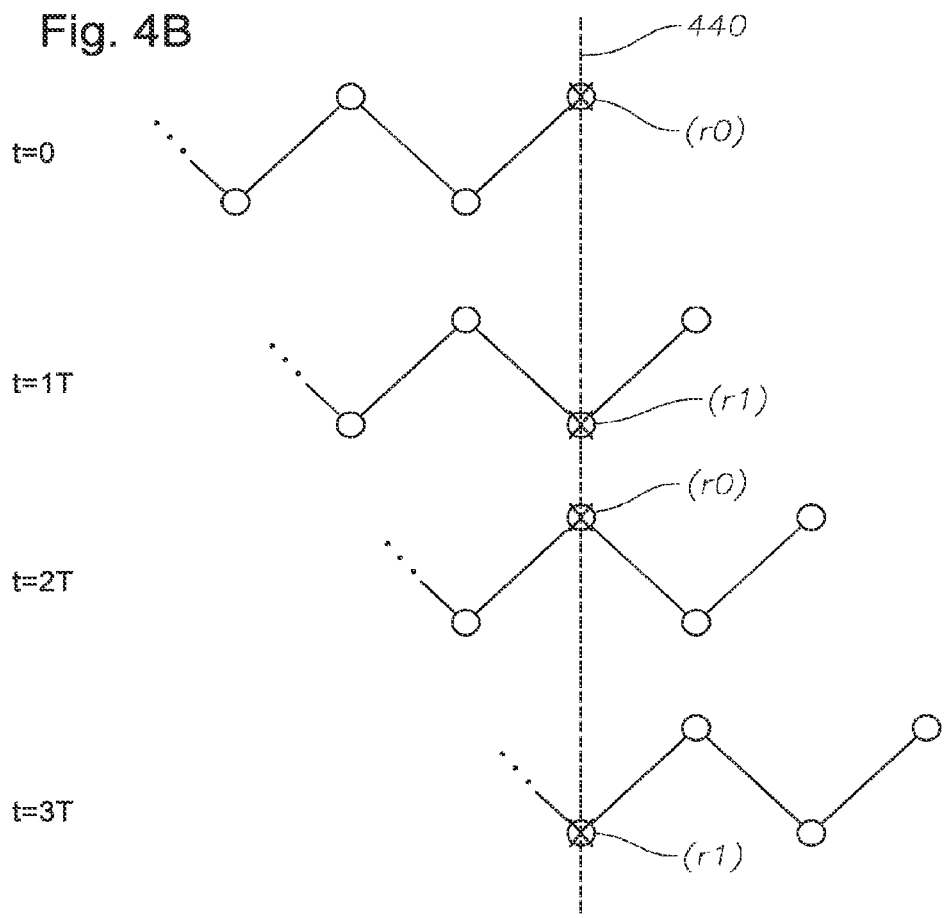

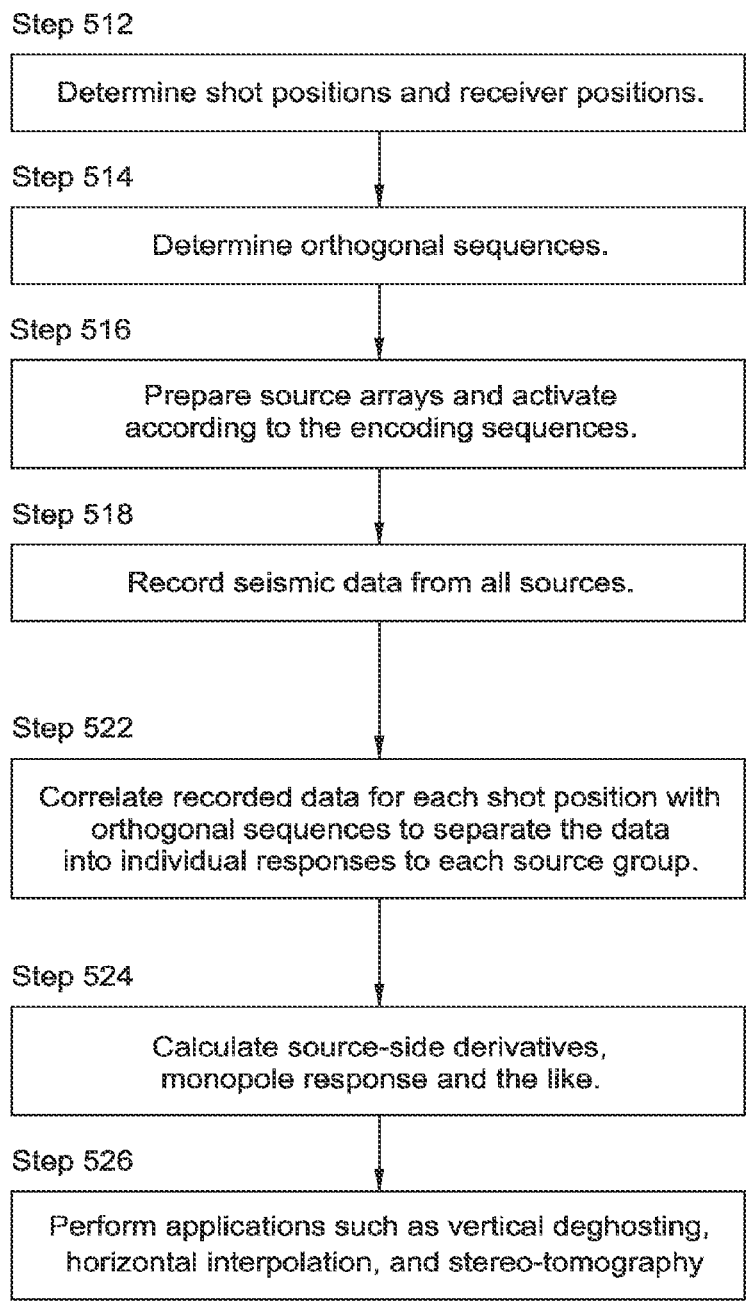

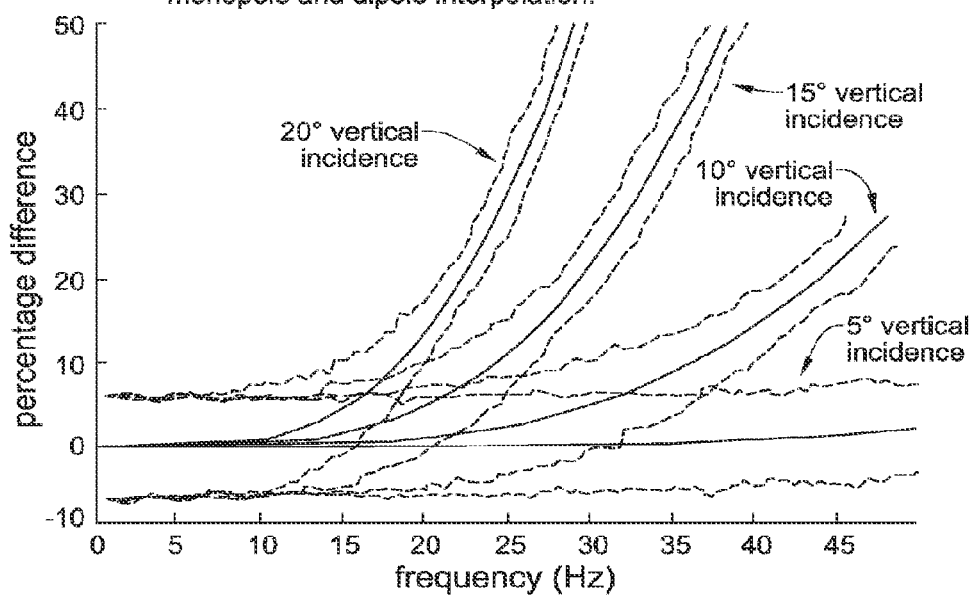
Fig. 8A  Percentage difference between expected result and interpolated result (solid line) with standard deviation (dashed lines) for monopole and dipole interpolation.
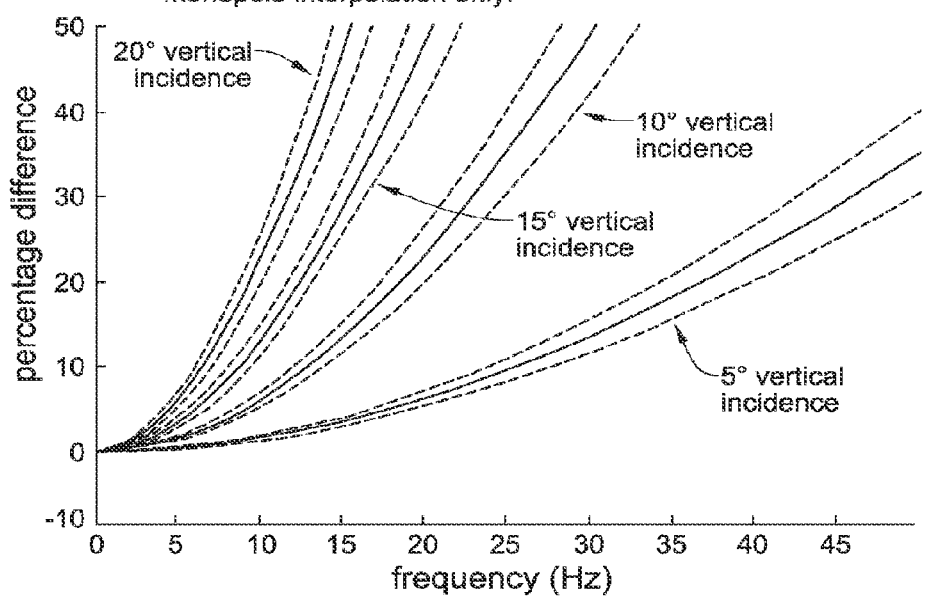
Fig. 8B  Percentage difference between expected result and interpolated result (solid line) with standard difference (dashed lines) for monopole interpolation only.

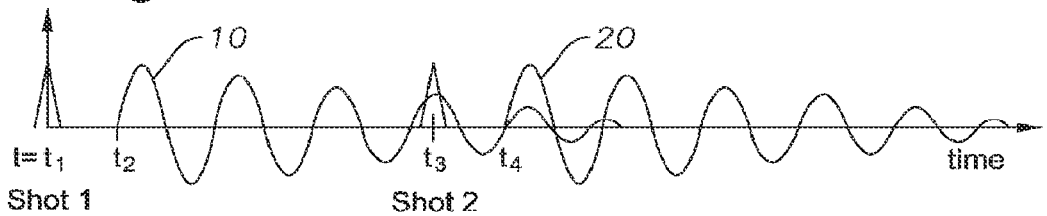

Step 1010

Synchronize data for each shot with reference to its shot time, and process to enhance lateral coherence.

Step 1020

Synchronize data for each shot with reference to the previous shot's firing time.

Step 1030

Process data from step 1020 to enhance lateral coherence.

Step 1040

Resynchronize the residual shot noise data from step 1030 for each shot with reference to its shot time.

Step 1050

Subtract the residual shot noise from step 1040 from the original shot data from step 1020.

Step 1060

Process the noise reduced data to produce the seismic image.

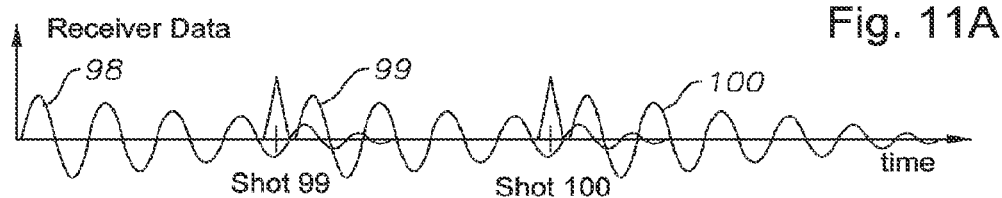
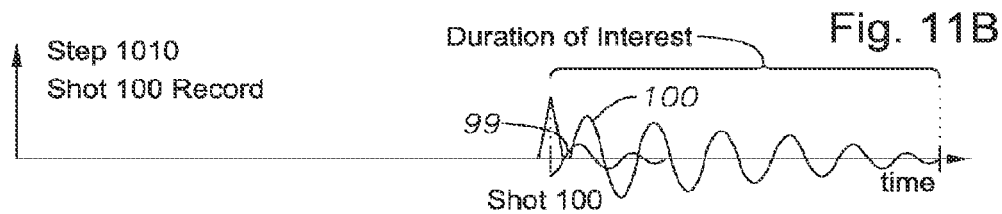
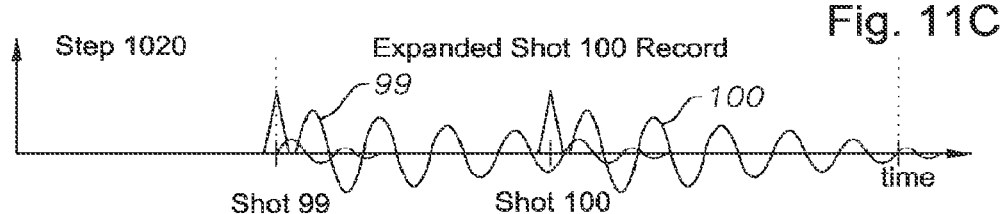
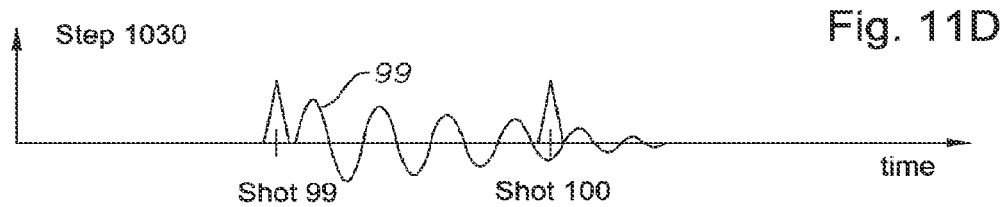
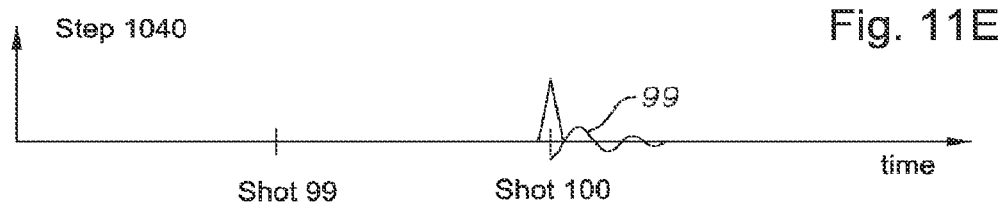
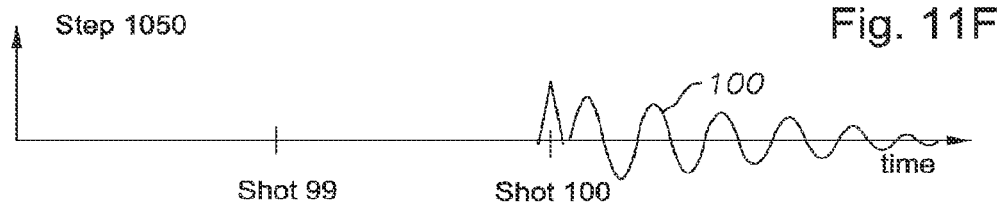

Fig. 12

Step 1210
> Perform typical baseline seismic survey while accurately recording shot times.

Step 1220
> Perform repeat survey using the same shot time and shot positions as used in the baseline survey.

Step 1230
> Process the seismic data from the baseline and repeat surveys in the same manner.

Step 1240
> Subtract the repeat survey image from the baseline survey image to produce the time lapse difference image.

Fig. 13

Step 1310
> Determine the mutually orthogonal sequences to be used in the seismic survey.

Step 1320
> Perform seismic survey in which sequential shots are encoded with alternating sequences.

Step 1330
> Decode the seismic data using the sequences to separate the seismic response to each shot.

Step 1340
> Process the residual shot noise reduced data to generate a seismic image.

SEISMIC DATA ACQUISITION AND SOURCE-SIDE DERIVATIVES GENERATION AND APPLICATION

CROSS-REFERENCE TO RELATED APPLICATIONS

This application is a divisional of co-pending U.S. patent application Ser. No. 13/218,881 filed Aug. 26, 2011; which is a continuation of U.S. patent application Ser. No. 13/011,832 filed Jan. 21, 2011, now U.S. Pat. No. 8,203,906 issued Jun. 19, 2012; which is a divisional of U.S. patent application Ser. No. 12/340,625 filed Dec. 19, 2008, now U.S. Pat. No. 7,876,642 issued Jan. 25, 2011; which is a divisional of U.S. patent application Ser. No. 11/459,441 filed Jul. 24, 2006, now U.S. Pat. No. 7,492,665 issued Feb. 17, 2009; all of which are herein incorporated by reference in their entireties.

BACKGROUND

The following descriptions and examples are not admitted to be prior art by virtue of their inclusion within this section.

Implementations of various technologies described herein generally relate to seismic acquisition. In a seismic survey, a source may be activated to generate energy, which may be reflected back by the earth's sub-surface layers. The resultant seismic wavefield may be sampled by an array of seismic receivers disposed at a distance from the seismic source. Each receiver may be configured to acquire seismic data, which are normally in the form of a record or trace representing the value of some characteristic of the seismic wavefield against time. Information about the earth's sub-surface can be obtained from the acquired seismic data.

Typically, a plurality of sources and receivers are arranged in a grid, such that the recorded data from the wavefields may substantially cover the entire area of exploration and with sufficient resolution to detect the variation of the sub-surface structure over small spatial distances. The wavefields recorded by the receivers may be a result of the superposition of many waves having different paths through the earth's sub-surface before finally reaching the receivers. This makes the reconstruction of the earth sub-surface difficult. One objective of seismic data processing is to separate the wavefields into coherent waves in connection with creating an accurate image of the earth's sub-surface layers. Because seismic data acquisition is very expensive, it is desirable to increase the distance between the grid points and still provide sufficient resolution or use the same or tighter grid and achieve finer resolution.

In a time-lapse seismic survey, a survey may be performed in the same location as a previous survey for the purpose of comparing the sub-surface structure interpretations of the two surveys. For optimal results, it may be desirable for the sources to be activated at the same locations and the receivers to be located at the same locations in both surveys. This precision may be very difficult. Therefore, a method or system designed to minimize the detrimental effects of inaccuracies in positioning the sources and receivers may be very desirable.

SUMMARY

Described herein are implementations of various technologies for acquiring monopole source data and multi-pole source data, as well as applications of monopole and multi-pole data. Monopole data may be defined as the wavefield data resulting from the activation of a single source or source group, which may be defined as a plurality of sources acting together as a single source. Multi-pole data, including dipole data, may be defined as the wavefield data resulting from two or more different sources or source groups that are activated in close proximity. In one implementation, the dipole or multi-pole data may be acquired by activating source groups in close proximity according to orthogonal sequences. The dipole or multi-pole data from the receivers may be decoded using the same orthogonal sequences, such that the wavefields resulting from the different sources can be separated. The orthogonal sequences may be constructed in many different ways depending on the needs and application of the resulting multi-pole data.

Described herein are also implementations of various technologies for a method for acquiring seismic data. In one implementation, the method may include emitting a first source signal based on a first activation sequence, emitting a second source signal based on a second activation sequence that is orthogonal to the first activation sequence, recording seismic data in response to the first source signal and in response to the second source signal and decoding the seismic data based on the first activation sequence and the second activation sequence.

Described herein are also implementations of various technologies for a seismic data acquisition system, which may include a first source group having a plurality of seismic sources arranged therein according to a first activation sequence, a second source group having a plurality of seismic sources arranged therein according to a second activation sequence and a source controller coupled to the first source group and the second source group. The source controller may be configured to activate each seismic source in the first source group according to the first activation sequence and each seismic source in the second source group according to the second activation sequence. The first activation sequence is orthogonal to the second activation sequence.

Described herein are also implementations of various technologies for using the monopole and multi-pole data. In one implementation, the dipole data may be used to calculate various derivatives of the wavefield. In another implementation, the multi-pole data may be used to calculate higher order derivatives and other relevant data. The monopole data, multi-pole data, derivatives and other data may be used to deghost seismic images, interpolate data for use in time-lapse seismic surveys, multiple suppression, and imaging (e.g., through stereo-tomography).

Described herein are also implementations of various technologies for a method for generating and applying source-side derivatives. In one implementation, the method may include acquiring a response to a first seismic source and a response to a second seismic source at a plurality of source locations, deriving a source-side derivative from the response to the first seismic source and the response to the second seismic source for each source location and applying the source-side derivatives.

Described herein are also implementations of various technologies for a method for processing seismic data. In one implementation, the method may include processing seismic data acquired using a first source signal emitted based on a first activation sequence and a second source signal emitted based on a second activation sequence orthogonal to the first activation sequence and decoding the seismic data based on the first activation sequence and the second activation sequence.

Described herein are also implementations of various technologies directed to the reduction of residual shot noise in seismic data. In one implementation, shot times may be used in processing the reduction of residual shot noise. In another implementation, shot times as well as shot positions may be constrained during acquisition such that spatial coherence in the residual shot noise may be enhanced. In yet another implementation, the constrained shot times and positions may be used during repeat surveys such that residual shot noise may be reduced in time-lapse difference images. In another implementation, a typical survey may be performed using alternating orthogonal sequences. Then, the monopole data may be decoded using the same orthogonal sequences, such that residual shot noise can be distinguished.

The claimed subject matter is not limited to implementations that achieve any or all of the noted advantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

It is to be noted that the appended drawings illustrate only typical embodiments of this invention and are therefore not to be considered limiting of its scope, for the invention may admit to other equally effective embodiments.

FIGS. 2A-B illustrate mutually orthogonal encoding sequences and their application for seismic source encoding in accordance with implementations of various technologies described herein.

FIG. 4A-B illustrate an alternative implementation combining the use of an in-line source array as illustrated in FIG. 3F and the concept of leaving out non-activated sources as illustrated in FIG. 3G.

FIG. 5 illustrates a flow diagram of a method for encoding and decoding seismic data in accordance with implementations of various technologies described herein.

FIGS. 8A-B illustrate the noise tolerance of interpolation over the typical seismic spectrum using dipole and monopole data.

FIG. 9 illustrates a simple diagram of residual shot noise.

FIG. 10 illustrates a flow a diagram of a method for reducing residual shot noise during seismic data processing in accordance with implementations of various techniques described herein.

FIGS. 11A-F illustrate the methodology illustrated in FIG. 10 using an attenuating wave to depict the seismic data recorded in response to each shot.

FIG. 12 illustrates a method for generating a time-lapse difference image in accordance with implementations of various techniques described herein.

FIG. 13 illustrates a method for acquiring and processing seismic data using orthogonal sequences to reduce residual shot noise.

DETAILED DESCRIPTION

Figure 1A:
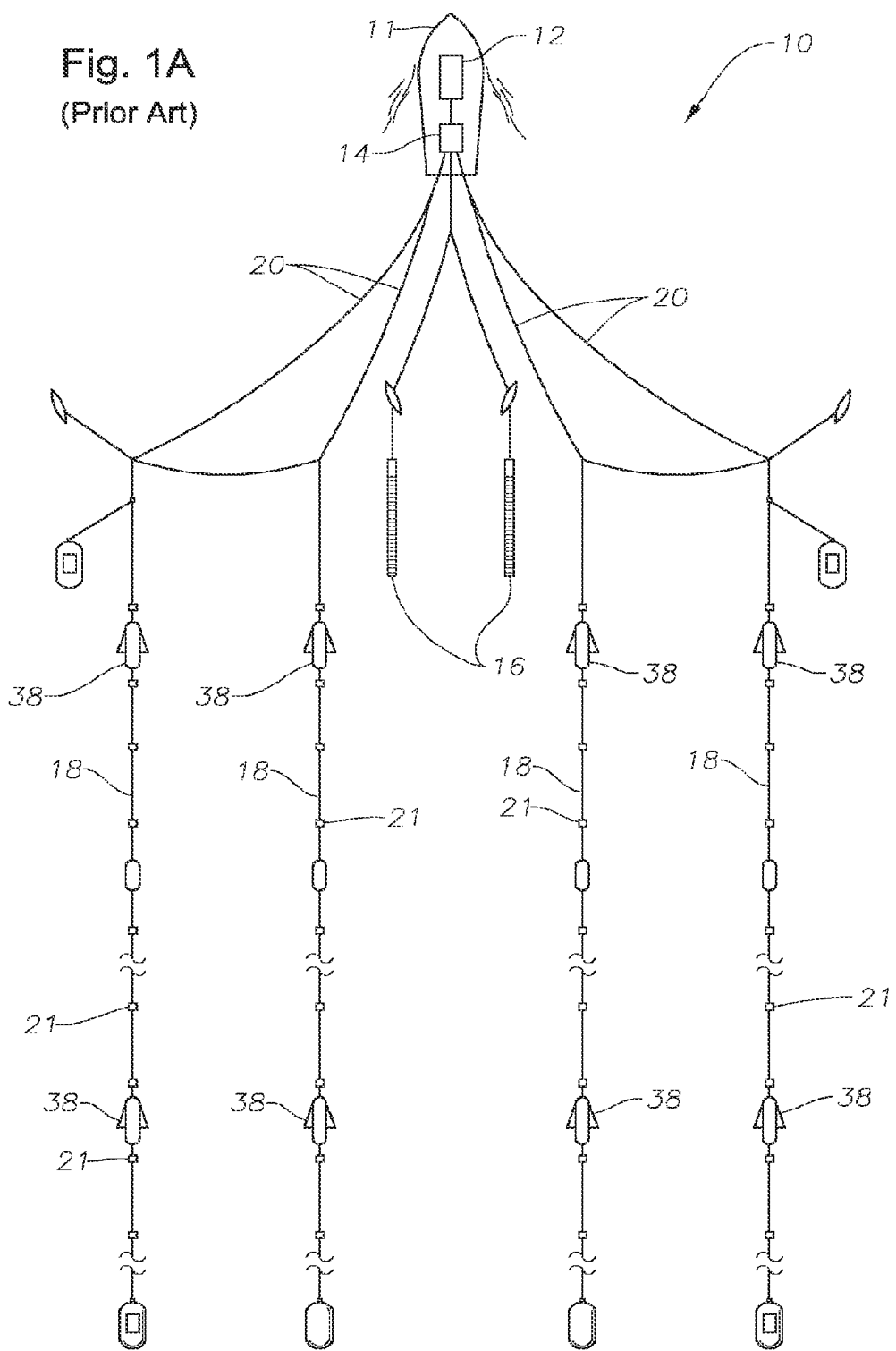
FIGS. 1A-B illustrate a typical marine seismic acquisition survey system for performing 3D or 4D surveys.
Figure 1B:
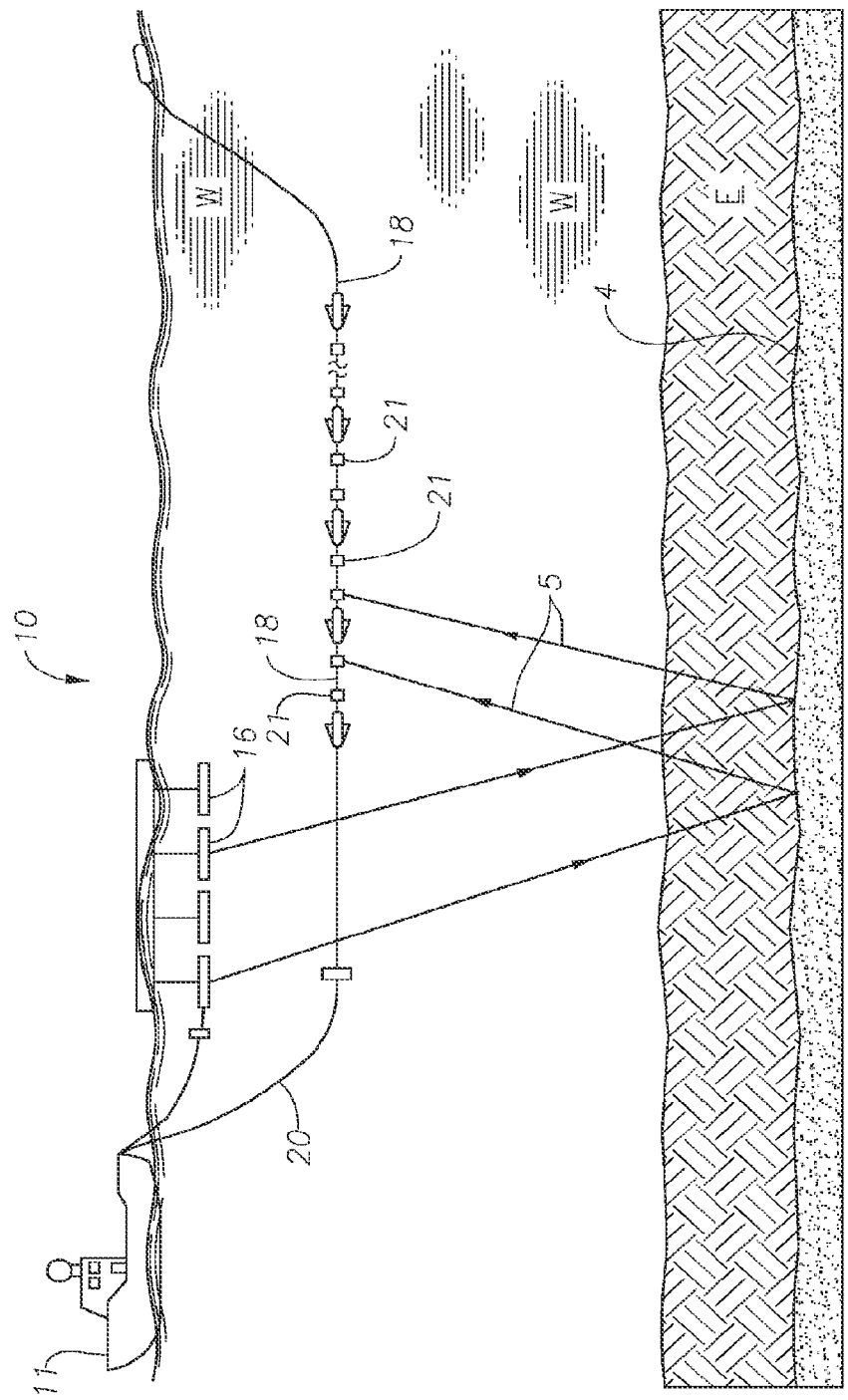

For simplicity, where marine seismic survey is discussed, positive X direction is the direction where the towing vessel is going. With reference to FIG. 1A, the Y direction is the horizontal direction perpendicular to the X direction. The Y direction may also be referred to as cross-line direction. With reference to FIG. 1B, the positive Z direction is a vertical-up direction. For clarity, when referring to an airgun or similar single source, the word source will be used. When referring to a plurality of sources used collectively as a single source, the words source group will be used. When referring to a line of sources towed by a vessel, the words source array will be used.

FIGS. 1A-B illustrate a typical marine seismic acquisition survey system 10 for performing 3D or 4D surveys. Although implementations of various technologies described herein are with reference to the marine seismic acquisition survey system 10, it should be understood that other implementations may use any seismic acquisition system.

The typical marine seismic acquisition system 10 may include a vessel 11 carrying control components 14 and towing a plurality of seismic sources 16 and a plurality of streamers 18 equipped with seismic receivers 21. The vessel 11 may further include a GPS receiver 12 coupled to the control components 14, which may be an integrated computer-based seismic navigation (TRINAVT™), source controller (TRISOR™), and recording (TRIACQ™) system (collectively, TRILOGY™). The seismic sources 16 may be made of the same types of sources, or they may be made of different types of sources. The sources may be any type of common seismic generator, such as air guns, water guns, steam injection sources, explosive sources such as dynamite or gas injection followed by detonation and the like. The streamers 18 may be towed by means of their respective lead-ins 20, which may be made from high strength steel or fiber-reinforced cables that convey electrical power, control and data signals between the vessel 11 and the streamers 18. Each streamer 18 may include a plurality of seismic receivers 21, distributed at spaced intervals along the streamer's length. Each receiver 21 may be a hydrophone sensor and the like. Each receiver 21 may be separately wired so that its output signal can be separately digitized and filtered, thereby permitting sophisticated processing known as digital group forming, as described in commonly assigned U.S. Pat. No. 6,684,160, which is incorporated herein by reference. Further, the streamers 18 may include a plurality of inline streamer steering devices (SSDs) 38, also known as "birds," such as Q-FIN™ birds of the kind described in commonly assigned U.S. Pat. No. 6,671,223, which is incorporated herein by reference. The SSDs may be distributed at appropriate intervals along the streamers 18 for controlling the streamers' depth and lateral movement.

During acquisition, the seismic sources 16 and the seismic streamers 18 may be deployed from the vessel 11 and towed very slowly, for example about 5 knots. The seismic sources 16 may be periodically activated, for example every 10 seconds or so, emitting seismic energy in the form of an acoustic wave through the water. Each source 16 may be activated independently or simultaneously with other sources. The acoustic wave may result in one or more wavefields that travel coherently into the earth E underlying the water W (see FIG. 1B). As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system 14 (see FIG. 1A) in the vessel 11 via the streamers 18 and lead-ins 20. Through analysis of these detected signals, it may be possible to determine the shape, position and lithology of the sub-sea formations, including those formations that may likely contain hydrocarbon deposits.

The representation of the sub-surface layers in the survey area may be formed by combining seismic data collected along a plurality of sail lines. Although ideally the sail lines are approximately straight, wind, water currents, waves, steering of the survey vessel and the like may cause the sail lines to be less than perfectly linear. Furthermore, the seismic data may be collected along paths that are purposefully non-linear. For example, it may be desirable to repeat the non-linear sail lines of a prior seismic survey for purposes of time-lapse comparison, also known as a 4D survey. Non-linear sail lines may exhibit shapes including elliptical paths, circular paths, and figure-8 paths, among others.

A single survey vessel may tow a single receiver array along each of the sail lines. Alternatively, a plurality of survey vessels may tow a plurality of receiver arrays along a corresponding plurality of the sail lines. In various alternatives, the data may be collected during a single survey conducted over a short period of time such as one day, or it may be collected in multiple surveys performed at different times. Inclement weather and/or high seas may force a survey to be suspended before resuming hours or days later. In some implementations, historical data from previous surveys performed months or years earlier may be combined with new data to extend the survey or to fill in deficiencies in coverage that may be introduced by currents, obstacles such as platforms and the like. Data from repeat surveys may also be used to analyze and monitor changes in productive oil and/or gas reservoirs.

The accuracy and/or resolution of the image formed using the acquisition data may be limited by uncertainties as to the actual path of the seismic sources and receivers through the water. Although the survey vessel typically attempts to tow the seismic sources so that its geometric center-of-source follows a desired sail line, water currents, wind, waves and the like may divert one or more sources from the desired path. The accuracy and/or resolution may further be limited by noise superimposed on the wavefield of interest. Noise may be caused by residual shot noise, waves and the like. The accuracy and/or resolution may further be limited by constraints on the quantity of data collected. If a source or source group is activated in close time proximity to the previous shot, the responses received by receivers may become superimposed with each other. Thus, a sufficient time interval must be allowed between shots. Because the vessel continues to move during the time interval, the quantity of data collected over a certain area may be constrained.

In a typical marine seismic survey as described above, monopole data may be recorded. Monopole data refer to the data recorded at the receivers in response to a single source or source group. Dipole data refer to the data recorded at the receivers in response to two sources or source groups activated in close proximity. Dipole data may be obtained by subtracting the monopole response from each of the source locations and dividing by the distance between the source locations. Close proximity, as used in this application, may refer to the distance between two sources or source groups that is within a fraction of the minimum wavelength of the seismic waves of interest. In most seismic surveys, close proximity may be about 3 meters to about 15 meters. Multi-pole data refer to data recorded at the receivers in response to multiple sources or source groups activated in close proximity with appropriate polarities. Currently, dipole or multi-pole data may be acquired by conducting two or more surveys, each survey collecting monopole data in close proximity to the shot positions. Dipole or multi-pole data may also be acquired by sequentially activating sources in a single survey such that two or more monopole responses may be recorded in close proximity to each pre-defined shot position. With dipole or multi-pole data, source-side derivatives may be generated and used in various applications to enhance image accuracy and resolution. However, these current methods of acquiring multi-pole data significantly increase the survey costs. Accordingly, implementations of various technologies described herein are directed to simultaneously acquiring dipole and multi-pole data with limited cost increase.

Encoding/Decoding Sources

FIGS. 2A-B illustrate mutually orthogonal encoding sequences and their application for seismic source encoding in accordance with implementations of various technologies described herein. Digital encoding and decoding have been used in many communication applications, such as telecommunications. The theories and applications are discussed in telecommunication literatures, such as "Sequence Design for Communications Application," by Pingzhi Fan and Michael Darnell, 1996. However, such encoding and decoding have never been used in seismic data acquisition or processing. In seismic acquisition, source groups may be encoded using digital sequences where each source 'pop' represents a spike in a sequence. The sequence for one source group may be selected such that it is orthogonal to the sequences for other source groups. Each sequence may be orthogonal to all the other sequences, which means that the cross-correlation between any pair of sequences is substantially zero for all time-shifts, while the auto-correlation (e.g., the correlation of a sequence with itself) has a large value only for the zero time-shift and is substantially zero for all non-zero time-shifts. In one implementation, the large value may be a spike having amplitude of substantially one or unity. In a cross-correlation or auto-correlation, the similarity between two discrete data series is measured for different relative time-shifts between the series by multiplying the amplitude of the shifted and un-shifted data series on a point-by-point basis and summing (integrating) over all the points. By utilizing orthogonal sequences, the response from each source group may be decoded, and thus isolated from the superposition of responses from all the other source groups by cross-correlation with each encoding sequence. In one implementation, the sources within the source groups may be fired simultaneously. In another implementation, the sources within the source groups may be fired sequentially.

FIG. 2A illustrates a simplified example of a pair of digital sequences in accordance with implementations of various technologies described herein. Sequence 220 may be represented digitally as (0, 1, 0, 1, 0, 0, 1, 1) and sequence 230 as (1, 0, 1, 0, 1, 1, 0, 0). These sequences 220 and 230 may also be represented as activated or non-activated sources. As such, "1" may indicate an activation of the source at a point in time, which may be represented as a spike. On the other hand, "0" may indicate that the source is silent, or not activated, at a point in time.

In one implementation, each activation or non-activation may be separated by a fixed time period T such that the entire firing sequence period may be on the order of approximately 200 ms. For example, at time equal to zero, sequence 220 has a digital "0" indicating no activation. However at time equal to zero, sequence 230 contains a digital "1" indicating an activation, as shown by the spike. While each activation or non-activation has been described as representing a single source, it should be understood that in some implementations each activation or non-activation may represent a plurality of sources.

FIG. 2B illustrates how two source groups 200 and 210 may be activated simultaneously according to sequences 220 and 230 illustrated in FIG. 2A. Source group 200 may follow sequence 220 and source group 210 may follow sequence 230. Source groups 200 and 210 may be towed across the shot position 240 with source group 200 crossing location (r0) and source group 210 crossing (r1) in close proximity to (r0). At time equal to 0, the first source in each source group crosses the shot position 240. According to the sequences in FIG. 2A, source 221 of source group 200 may not be activated and source 231 of source group 210 may be activated, as indicated by the 'x'. At time equal to 1T, the two source groups 200 and 210 may be towed forward such that the second pair of sources in source groups 200 and 210 crosses the shot position 240. Source 222 of source group 200 may be activated while source 232 of source group 210 may not. As time goes on, the two source groups 200 and 210 may continuously move forward such that each source may be activated or not activated according to their respective activation sequence. Although FIG. 2B illustrates the activation of a pair of source groups in close proximity with respect to the Y direction, many other arrangements may be implemented, some of which are illustrated in FIGS. 3B-F below. FIG. 2B illustrates the use of two source groups; however, many source groups may be used simultaneously with the same number of mutually orthogonal codes used to encode each of the source groups. Depending on the number of source groups to be encoded/decoded, any suitable orthogonal sequence set with a sufficient number of orthogonal codes may be constructed and implemented.

In one implementation, orthogonal sequences may have the property that the cross-correlation with any other sequence from the same orthogonal sequence set substantially equals to zero for all time-shifts. Also, the orthogonal sequences may have the property that the auto-correlation of a sequence results in a discrete delta-function, which only has a large, non-zero value at zero time-shift (i.e., when the sequence is not shifted with respect to itself) and substantially equals to zero for all other time-shifts. However, the requirements for the cross-correlation and auto-correlation may be relaxed, as long as the main lobe of the auto-correlation is narrow and has an amplitude that is substantially greater than the side-lobes of the auto-correlation as well as the noise-level in the cross-correlation resulting from imperfect orthogonality. Also, in one implementation, the encoded source sequences should have as short duration as possible while at the same time the time-delay between consecutive activations (pops) should be big enough to prevent cross-talk between sources due to reduced resolution in the frequency domain. Such sequences may be described in more detail in Fan, P., Darnell, M., 1996, Sequence Design for Communications Applications, Chapter 15, Optical Orthogonal Sequences, Research Studies Press, which is incorporated herein by reference. Unlike the application in telecommunication where the sequences may be mostly periodic, the responses from earth may be typically aperiodic. Optical orthogonal sequences typically have better periodic correlations than aperiodic ones and may need to be adapted for use in seismic surveys. The orthogonal sequences may also be determined by simulated annealing, which is an optimization algorithm that searches for the minimum value of a function. Such technique may be described in more detail in Grønaas, H., 2000, Simultaneous Acquisition with Impulsive Marine Seismic Sources, OTC Summer Student Internal Report, which is incorporated herein by reference.

Referring to FIG. 2A, mathematically, encoding and decoding may be performed as follows. The source group 200 signal convolved with the sequence 220 is:

$$S(r0, t) = S(t) * seq(220)$$
$$= S(t) * [\text{delta}(t - T) + \text{delta}(t - 3T) + \text{delta}(t - 6T) + \text{delta}(t - 7T)]$$
$$= S(t - T) + S(t - 3T) + S(t - 6T) + S(t - 7T),$$

where * denotes convolution, delta(t−T) denotes a delta-function delayed by time T, seq(220) denotes the orthogonal sequence and S(t) denotes the source-time function of the individual sources in the source group. The last identity follows from the fact that convolution with a delta-function implies replacing the argument of the original function with the argument of the delta-function. Thus, encoding may results in a superposition of delayed versions of the original source-time function. This, of course, is exactly how encoding is done in practice.

Similarly, the source group 210 signal convolved with the sequence 230 is:

$$S(r1, t) = S(t) * seq(230)$$
$$= S(t) * [\text{delta}(t - 0T) + \text{delta}(t - 2T) + \text{delta}(t - 4T) + \text{delta}(t - 5T)]$$
$$= S(t - 0T) + S(t - 2T) + S(t - 4T) + S(t - 5T)$$

At receivers, the receiver signal is the superposition of the effective source signals, convolved with the Earth's response:

$$R(r, t) = GF(r, r0, t) * S(r0, t) + GF(r, r1, t) * S(r1, t)$$
$$= S(t) * [GF(r, r0, t) * seq(220) + GF(r, r1, t) * seq(230)],$$

where GF(r,r0,t) denotes the so-called Green's function (i.e., the response of the subsurface recorded as a function of time in point r, due to an impulsive source in point (r0) and GF(r, r1,t) has a similar interpretation.

The received signal may be decoded by cross-correlation with the sequences. For example, cross-correlating the received response with sequence 220 gives:

$$R200(r, t) = seq(220) \times S(t) * \begin{bmatrix} GF(r, r0, t) * seq(220) + \\ GF(r, r1, t) * seq(230) \end{bmatrix}$$
$$= S(t) * \begin{bmatrix} GF(r, r0, t) * seq(220) \times seq(220) + \\ GF(r, r1, t) * seq(220) \times seq(230) \end{bmatrix}$$
$$= S(t) * [GF(r, r0, t) * \text{delta}(t) + GF(r, r1, t) * \text{zeros}(t)]$$
$$= S(t) * GF(r, r0, t),$$

where x denotes cross-correlation and zeros(t) is a trace with values close to zero, denoting the approximate orthogonality of the sequences 220 and 230, i.e., seq(220)×seq(230)=zeros(t). Note that the auto-correlation of seq(220) approximates a delta-function, i.e., seq(220)×seq(220)=delta(t).

The decoded function R200(r,t) is S(t)*GF(r,r0,t), which is the response to source group 200 only. The effect from source group 210 has been removed. Similarly, R210(x,y,z,t) may be deduced, which is the response to source group 210 only. Therefore, if the proper orthogonal sequences may be constructed, the seismic responses to each source group that is encoded may be decoded, even if the source groups are activated virtually simultaneously.

Source Arrangement

Figure 3A:
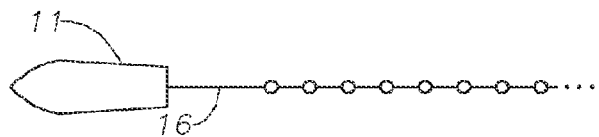
FIGS. 3A-G illustrate various seismic source arrays in accordance with implementations of various technologies described herein.

FIGS. 3A-G illustrate various seismic source arrays in accordance with implementations of various technologies described herein. FIG. 3A illustrates a prior art source array 16 with a plurality of seismic sources, such as air-guns or water-guns, towed behind a vessel 11 in a linear fashion along the sail line. The sources may be controlled by a source controller and may typically be activated at the same time. This type of source array may be used to sequentially fire sources with orthogonal sequencing. In one implementation, the sources may be fired in accordance with a first sequence, e.g., sequence 220, and then fired with a second sequence, e.g., sequence 230, such that the sequences alternate.

Using the technologies described herein, dipole or multi-pole data may be obtained by activating two or more separate sources (or source groups) in close proximity, about 3-15 meters. Using orthogonal sequences as described in FIGS. 2A-B, two or more source groups may be fired simultaneously to obtain this data. FIGS. 3B-G illustrate a few possible source array implementations that may be used to obtain dipole or multi-pole data using the various technologies described herein.

Figure 3B:
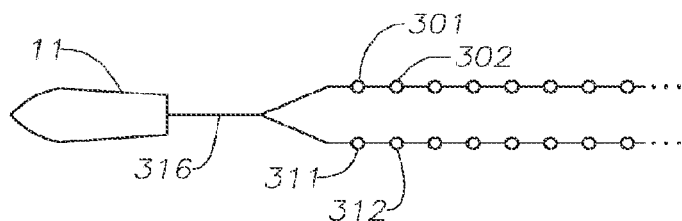

FIG. 3B illustrates a source array 316 towed behind a vessel 11 in which two source groups may be towed in parallel offset in close proximity in the Y direction. At each source location, a pair of two sources, e.g., 301 and 311, 302 and 312, may be installed. Each source may be individually controlled by a source controller and activated at the appropriate time independently. Each source may be a single air-gun or the like, or a plurality of sources acting as a single source in the form of a single point source, a linear source or otherwise. The two source groups may be fired simultaneously according to the orthogonal sequences selected, with only one source in each pair of sources being activated as it passes over the shot position as illustrated in FIG. 2B. In one implementation, the distance between the two sources within a pair (e.g., distance between sources 301 and 311) may be in such close proximity that in some situation the pair may be considered a single source.

Figure 3C:
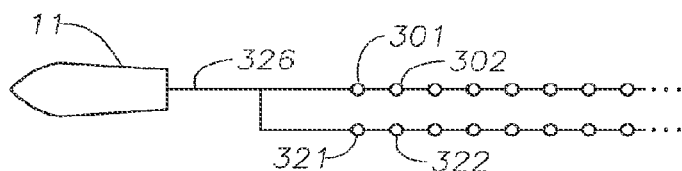
Figure 3D:
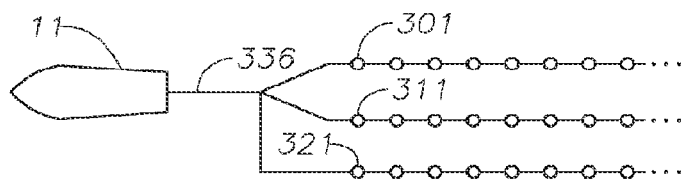
Figure 3E:
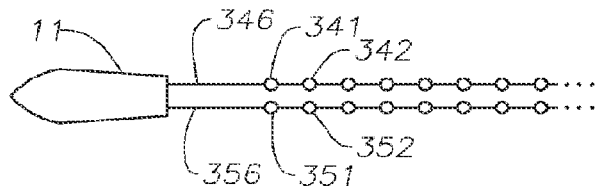

FIG. 3C illustrates a source array 326 where source pairs (e.g., 301 and 321, 302 and 322) may be arranged in close proximity in the Z direction such that dipole data in the Z direction may be obtained. FIG. 3D illustrates a source array with three source groups where three sources (a cluster of sources) may be located in close proximity at each source location such as 301, 311 and 321. The arrangement in FIG. 3D may provide multi-pole data in both the Y direction and Z direction simultaneously. If the sources within a cluster have different X-direction offset, then they may also provide dipole data in the X direction.

In the implementations illustrated in FIGS. 3B-D, the source groups may be arranged such that the sources are separated by a predefined distance within the pair or cluster, but other implementations may be possible. For example, in FIG. 3E, two linear source arrays 346 and 356 may be towed closely together by a vessel 11. The sources within the arrays 346 and 356 form multiple pairs, such as 341 and 351, 342 and 352. The distance between each source in a pair may be in close proximity, similar to those pairs as shown in FIGS. 3B-D. However, since the arrays 346 and 356 may be independently towed and steered, the relative positions of the sources 341 and 351, 342 and 352 may not be kept constant during a survey. The change in relative distance between the sources in a pair may be accommodated when the activation position of each source is recorded. This implementation may be useful for adapting existing source arrays for use with implementations of various technologies described herein. The arrays 246 and 256 may be towed to form pairs in the Y direction similar to the one shown in FIG. 3B, or in the Z direction as shown in FIG. 3C. If more than two arrays are towed closely, then an array similar to the one shown in FIG. 3D may be formed.

Figure 3F:
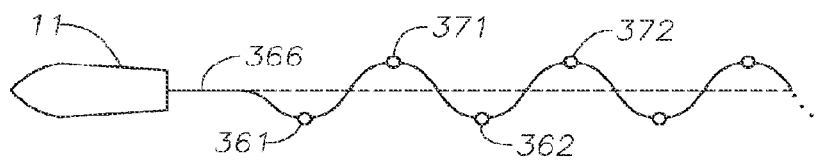

FIG. 3F shows another alternative source array 366, where source groups may be towed by the same cable, but are separated slightly from the sail line. This may be termed an in-line source array. When the source array is towed, sources 361 and 371 (or 362 and 372) may form a pair when they pass the shot position in close proximity. The distance between the sources in a pair may be similar to that of the source pairs shown in FIGS. 3B-E, but the pair of sources as shown in FIGS. 3B-E would pass the same location at the same time, while pairs in FIG. 3F would pass the same location at different times.

In the implementations shown in FIG. 3B-F, each source group contains a source in every pair location regardless of which sources may be activated. The sequence at a shot position may be implemented by activating an appropriate source at each time interval while other sources are not activated.

Figure 3G:
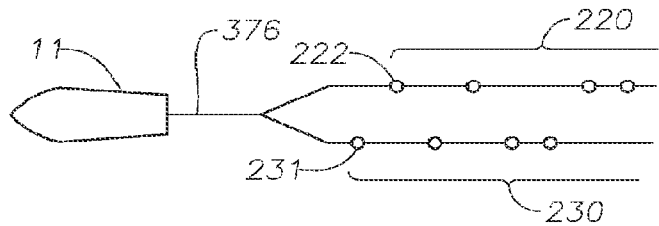

FIG. 3G illustrates a source array 376 in which the sequence may be built into the array by leaving out sources that are not activated. In this example, the activation sequences 220 and 230 of FIG. 2A may be implemented in a manner explained below. The individual sources may be distributed in a linear array such that distance between sources may be proportional to the activation time interval of each shot in the sequence. For example, at time equal to zero, source 231 crosses the shot position (r0) and may be fired. At time equal to 1T, source 222 crosses the shot position (r1) in close proximity to shot position (r0) and may be fired. Thus, a vessel moving at a constant speed allows these sources to be activated at the correct times over the shot position with the sources from different source groups in close proximity. The array 376 in FIG. 3G may be designed in the Y direction similar to the array 316 shown in FIG. 3B, or in the Z direction as shown by array 326 in FIG. 3C. The array 376 in FIG. 3G may be designed with an additional source group such that an array similar to the one shown in FIG. 3D may be formed.

FIG. 4A-B illustrate an alternative implementation combining the use of an in-line source array as illustrated in FIG. 3F and the concept of leaving out non-activated sources as illustrated in FIG. 3G. FIG. 4A illustrates the activation of digital sequence 420, which is (1, 0, 1, 0), and digital sequence 430, which is (0, 1, 0, 1). FIG. 4B illustrates the activation of sources in the single array where sources are arranged off-center of the sail line. In this implementation, every source passing the shot position 440 at (r0) or (r1) may be activated because of the arrangement of the sources and the sequences. Sources activated at (r0) make up one source group while sources activated at (r1) form the second source group.

The seismic sources used in the arrays illustrated in FIGS. 3A-G and 4B may be the same types of sources or they may different types of sources. The sources may be any type of common seismic generator, such as air guns, water guns, steam injection sources, explosive sources such as dynamite and gas injection followed by detonation and the like. Some sources have complementary properties in that some may be positive sources, generating positive seismic impulses, and some may be negative sources, generating negative seismic impulses. When the sources in an array are of the same type, the sequence may only be either activated (1) or not-activated (0). So the sequence may be composed of 1's and 0's. When the coding is limited to 1's and 0's, sequences may be more difficult to construct and longer in order to satisfy the orthogonality requirements. However, when the sources are of complimentary type, the sequence may be positively activated (1), negatively activated (−1) or not activated (0). As such, the sequence may be composed of 1's −1's and 0's. Thus, the sequences may be easier to construct and shorter because a greater number of orthogonal sequences may be available for encoding. For example, in seismic acquisition, air-gun and water-gun sources have opposite pressure amplitudes, and as such, using a combination of these sources may simplify encoding and decoding.

Method for Encoding and Decoding Seismic Data

FIG. 5 illustrates a flow diagram of a method for encoding and decoding seismic data in accordance with implementations of various technologies described herein. At step 512, the shot positions and receiver positions may be determined. For example, a grid of shot positions may be planned. At step 514, the orthogonal sequences may be determined. Selecting appropriate orthogonal sequences may be based upon several factors including the number of source groups used and the types of sources used. For example, if source side derivatives in both the Y and Z directions are desired, three source groups may be used requiring three separate mutually orthogonal sequences. Also, if air and water guns are used, orthogonal sequences with −1, 0 and 1 may be used. If different types of sources are to be used, then the allocations of different sources may also be determined. At step 516, sources may be installed at the determined locations in the source arrays. Sources and receivers may then be moved to the desired locations and the sources may then be activated according to the encoding sequences. At step 518, receivers may record data from all sources.

After the seismic data is collected and checked for quality control, the decoding process may be conducted, either on board the vessel in the field or back in a central office. At step 522, the recorded data may be separated by shot position and then correlated with each orthogonal sequence. Each correlation procedure generates one set of data that may be the response to the activation of one source group. After the correlation with all of the orthogonal sequences, the seismic data for each shot position may be separated into individual seismic data due to each source group in the source array. For example, in FIG. 2B the shot record for shot position 240 contains the seismic response to both source groups 200 and 210 that were fired simultaneously. Using correlation of orthogonal sequences 220 and 230, the shot record for shot position 240 may be divided into separate records for positions (r0) and (r1) corresponding to the separate source groups 200 and 210 firing unique orthogonal sequences 220 and 230. The decoded data, grouped together for each shot position, forms multi-pole data sets. The data may be used in a multitude of applications. For example, at step 524, further data processing for desired applications may be performed such as calculating source side derivatives, monopole responses and the like. At step 526, applications such as vertical deghosting, horizontal interpolation and stereo-tomography may be performed.

Controller Diagram

Figure 6:
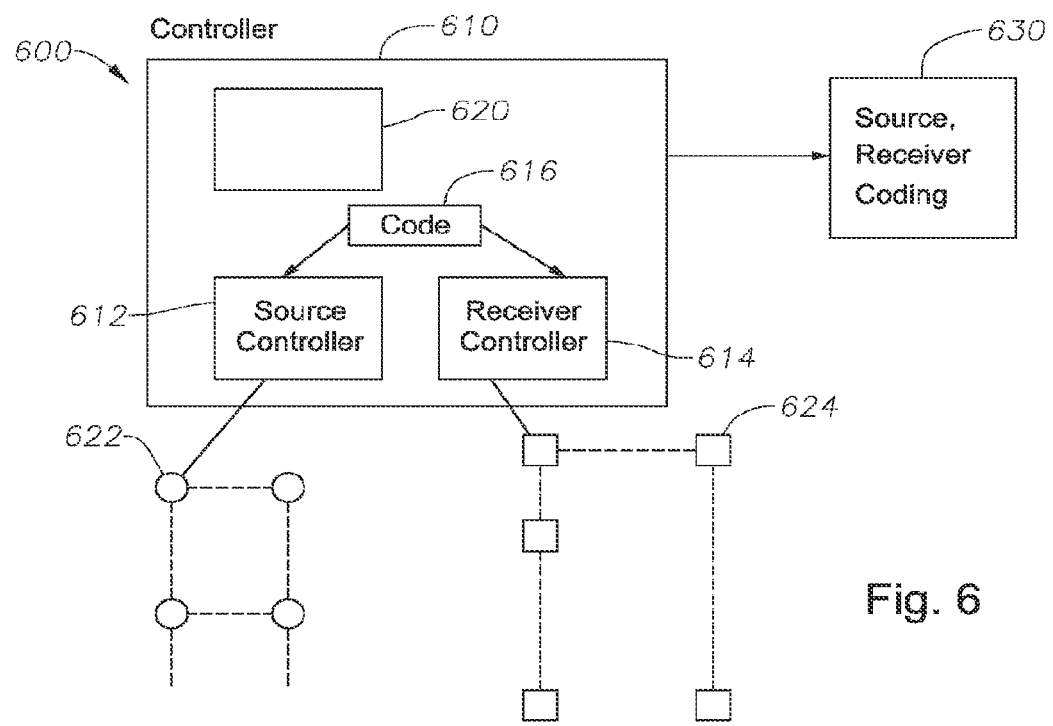
FIG. 6 illustrates a block diagram for a system performing a seismic survey and processing the seismic data in accordance with implementations of various technologies described herein.

FIG. 6 illustrates a block diagram for a system performing a seismic survey and processing the seismic data in accordance with implementations of various technologies described herein. An overall controller 610 may include a source controller 612, receiver controller 614, a code sequence generator 616 and other controllers 620. When a seismic survey plan is prepared, the positions of sources and receivers may be determined and forwarded to source controller 612 and receiver controller 614. The appropriate code sequences may be generated by the code generator 616 and sent to the source controller 612. The source controller 612 may then activate the sources 622 at the appropriate times. The receivers 624 may record the responses due to all of these sources. The received data may be recorded in a storage device 630 for further processing. The above referenced controllers may be positioned in the field or integrated into other components of the seismic survey system.

Source-Side Derivatives

Once dipole or multi-pole data has been acquired using the technologies described herein, derivatives may be calculated. The source-side derivative across two or more source positions may be calculated by taking the difference of the two Green's Functions (GF) and dividing by the distance between the two sources, as expressed by the following equation, $$\partial P_{x_i} = \frac{\vec{GF_1} - \vec{GF_2}}{\Delta x_i} + O(\Delta x_i^2)$$

If the gradient is required in several directions, then during acquisition separate source pairs in required directions may be implemented, as described in FIGS. 2B-G. Higher order derivatives in one or several directions may also be calculated if three or more source arrays were used in acquisition. For example, dipole data may be used to generate first degree derivative data. Tri-pole data may be used to generate second degree derivatives. Higher order derivatives, which may improve various applications of source-side derivatives, may also be generated.

Monopole Response

Dipole data yielding source side derivatives may be highly advantageous; however, a quality monopole response must also be obtained in addition to the dipole data in order for the source side derivatives to be used. Many applications utilize the lowest order term, the monopole data, and then utilize higher order terms such as derivatives. Since the seismic data decoded into the individual records may be noisier than typical monopole data, a combined monopole response for each pair or cluster of sources may be derived. One method averages the dipole or multi-pole data to calculate the monopole response. Another method of deriving monopole data uses Wiener Deconvolution on the combined response before decoding. In this method, the entire pair or cluster may be considered a single source. The monopole source signature may be the sum of the source groups activated simultaneously and the effective size of the monopole source pair/cluster may be the spatial distribution of all individual sources. The monopole data derived using this method may be as good as data acquired using conventional means to collect monopole data.

Deghosting

Deghosting a wavefield generally refers to the process of removing the down-going wavefield from the up-going wavefield. A prior art technique for deghosting data on the source-side sorts the data into common-receiver gathers, invokes reciprocity and uses translationally invariant Green's functions. However, this prior art technique may require dense shot spacing, may be prone to perturbation on the source side, may assume a lateral invariant sub-surface, may assume a flat sea surface and may require 3D or in-line 2D acquisition geometry. Most of these constraints may be avoided when deghosting is performed using the vertical source-side derivative obtained using the implementations of various technologies described herein.

The equations for deghosting may either be written in terms of up- and down-going pressure P or vertical particle velocity V. As an example, the expression for deghosting of P will be described below. The equation for up/down decomposition or deghosting of the wavefield in the frequency-wavenumber domain may be written as:

$$P^D = \frac{1}{2}\left(P + \frac{\rho\omega}{k_z}V_z\right) \quad (1)$$

where $P^D$ is the deghosted down-going part of the pressure on the source-side (capital letters denote wavenumber-frequency domain expressions), P is the total pressure, $V_z$ is the corresponding vertical component of particle velocity, $k_z$ is the absolute value of the vertical wavenumber (may be expressed in terms of frequency and horizontal wavenumbers using the dispersion relation in water), ω is the angular frequency and ρ is the density of water.

The time derivative of $V_z$ is proportional to the vertical pressure gradient $\partial_z P$ through the equation of motion such that $V_z$ may be calculated from pressure gradient data:

$$V_z = -\frac{1}{i\omega\rho}\partial_z P \quad (2)$$

Substituting Equation (2) into Equation (1), Equation (1) may therefore become $$P^D = \frac{1}{2}\left(P + \frac{i}{k_z}\partial_z P\right). \quad (3)$$

Equation (3) may be approximated using compact filters such that low wavenumbers may be deghosted well. Although a larger class of spatially compact filters may be of interest, a very simple one is discussed here, which may be accurate for vertical incidence only (zero horizontal wavenumbers). The vertical incidence approximation applied to equation (3) yields $$P^D \approx \frac{1}{2}\left(P - \frac{c}{i\omega}\partial_z P\right) \quad (4)$$

where c is the velocity of water. The second term in the bracket of equation (3) may now be interpreted in the space-time domain as a scaled version of the vertical derivative of pressure integrated in time.

The source-side deghosting approximation given by equation (4) may be effectively implemented when dipole or multi-pole data in the Z direction is obtained using the implementations of various technologies described herein; and when the monopole data is derived from the obtained dipole data using implementations of various technologies described herein. The average of the shots may be represented by P and their difference divided by the separation in depth between the shots may be represented by the source-side derivative, $\partial_z P$, which is accurate for small separation distances (e.g., 5 m or less). Here the distance between shot positions must be reduced because waves propagate close to vertical; and therefore, the sampling may need to be finer when the derivative is calculated in the vertical direction.

For the application of source-side deghosting, the reduction in the signal-to-noise ratio (S/N) due to approximate orthogonality may be much less destructive as the sources occupy the same position in the lateral plane and therefore excite the same wavenumbers when scattering from the subsurface. The error introduced by the insufficient separation of the two digital sequences during decoding may be similar to that introduced by inaccuracies in source calibration in nature. Even with the inaccuracy in the decoding of the dipole or multi-pole data, the source-side deghosting may be typically more effective than other prior art methods as mentioned above.

Horizontal Interpolation

There are several applications where interpolation between source positions in the horizontal plane may be of great benefit, such as time-lapse repeat survey matching to baseline survey positions, surface related multiple eliminations (SRMEs) and the like. For example, in a time-lapse seismic survey, shot positions may not be consistent across surveys. But, interpolation may be used to calculate shot position data from known shot positions. Typically, interpolation may be performed using monopole data only. However, interpolation results may be enhanced when the multi-pole data collected using the technologies described herein may be used for interpolation in addition to the monopole data. The noise in the data may restrict the interpolation distance.

Figure 7:
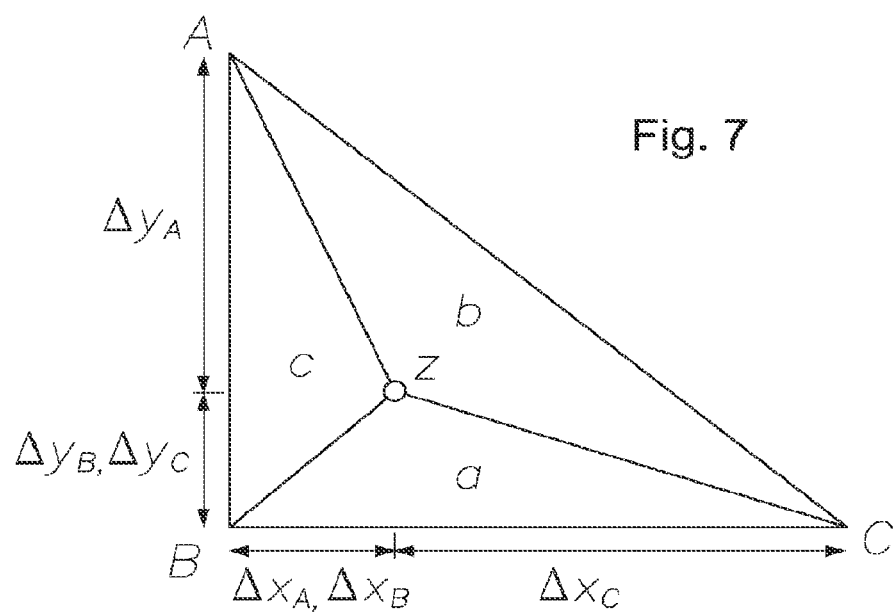
FIG. 7 illustrates an example of interpolation using data from three shot positions obtained in accordance with implementations of various technologies described herein.

FIG. 7 illustrates an example of interpolation using data from three shot positions obtained in accordance with implementations of various technologies described herein. In FIG. 7, the source position, Z, may be interpolated between three known shot positions, A, B and C. Each source position A, B and C may consist of a pair of source groups encoded using orthogonal sequences such that lateral derivatives in both the X- and Y-directions may be calculated. Source position Z may then be interpolated from the data, as discussed below.

By using a 'Dutch' Taylor expansion the following formula may be derived to interpolate from each source position, $$P_I(x + \Delta x, y + \Delta y) = P(x, y) + \frac{1}{2}\{\Delta x \partial_x P(x, y) + \Delta y \partial_y P(x, y)\}. \quad (5)$$

Using baricentric weighting, the three interpolations from each source position may be combined to give the estimate by interpolation of the point Z $$P_Z = aP_{IA} + bP_{IB} + cP_{IC} \quad (6)$$

where a, b and c are the areas shown in FIG. 7.

If more accurate interpolation is desired, then more source points may be encoded and decoded to generate more source-side data. With these interpolations the exact locations of sources becomes less important which eases the demand for accuracy on vessel navigation and streamer locations. This may also lengthen the seismic surveying season which is often limited by the weather and other navigation conditions.

FIGS. 8A-B illustrate the noise tolerance of interpolation over the typical seismic spectrum using dipole and monopole data. The interpolation performance was tested using simulation data. The amplitude of a plane wave was calculated at points along a line x for varying frequency between 0-50 Hz and angles of incidence of 0-40 degrees. This allowed points along the line to be interpolated using the calculated amplitudes from the ends of the line. These interpolated points were then compared to the actual calculated value at the center point of the line. The difference between the absolute value of the interpolated result and the absolute value of the calculated result was determined for each time and frequency and integrated over the period of the wave. The result was normalized by the initial calculated result such that a percentage error between the calculated result and interpolated result for each frequency was determined simply by multiplication by 100.

In order to determine how well this interpolation performs with noise levels that may be expected in the decoded data that may be used to calculate the spatial derivatives, values were drawn from Gaussian distributions with mean zero and standard deviation equal to the noise level expected. In the case of the monopole response, this noise level may be 0.0075; and in the case of the points used to determine the dipole response, the noise level may be 0.25. These are normalized noise levels. Interpolations were carried out 200 times so that a standard deviation for the final result may be determined for 200 realizations of the Gaussian noise.

In FIGS. 8A-B, the solid line represents the noise free case for the percentage difference between the expected value and the interpolated value. The dashed lines demonstrate expected noise and are the result plus and minus the standard deviation determined for the 200 realizations of the Gaussian noise.

In FIG. 8A, the results using monopole and dipole data are shown. At small incidental angles (<5 degree) or low frequencies (<20 Hz), the interpolation errors are very small. Even with noise at 25%, the errors are still relatively small, less than 10% and tolerable. When the frequency or incidence angle increases, the error in the interpolation may increase. In FIG. 8B, the results using both monopole data only are shown. As shown, the interpolation error using monopole data may be much worse than that using both monopole and dipole data, especially at higher frequencies and larger incident angles. For example, at about 10% error tolerance, the useable range using monopole data is less than about 30 Hz at less than a 5 degree incident angle or less than about 7 Hz at a 20 degree incident angle. For the same 10% error tolerance, the useable range using monopole and dipole data is up to 40 Hz at a 10 degree incident angle or up to 18 Hz at a 20 degree incident angle. Monopole data combined with dipole data provides superior interpolation results even at much higher noise levels. The test results show that by using data decoded from an encoded data set, it is possible to improve on simple monopole interpolation between two source positions, even though the noise introduced into the result may be higher in the case of the dipole.

Imaging

Various imaging application may be enhanced or become possible using the monopole and multi-pole data obtained in accordance with implementations of various technologies described herein. For example, stereo-tomography may be performed using derivatives from both the source side and the receiver side.

Residual Shot Noise Attenuation

In a typical marine seismic survey, the source may be fired as it passes over pre-defined shot positions, termed 'shooting on position.' These shot positions may typically be separated by equal distances in a grid. The distance between shot positions may typically be dictated by the approximate time required between shots. However when the survey is performed, since the shot positions are defined, the actual time interval between shots may vary as the vessel speed varies due to wind, currents, waves and the like. The time period containing useful data for a shot, which may be called the duration of interest, may be approximately 6 seconds or less. However, more time may be required for the seismic wave from the previous shot, termed residual shot noise, to attenuate to an acceptable level. Because of residual shot noise, shots may typically be fired approximately every 10 seconds to provide sufficient time for the residual shot noise to substantially dissipate. Since the slowest vessel speed is approximately 2.5 meters per second, the distance between shots is typically 25 meters. If the time and therefore, distance between shots could be reduced, greater image resolution as well as many other benefits could be achieved.

FIG. 9 illustrates a simple diagram of residual shot noise. As briefly mentioned above, residual shot noise generally constrains the time and distance between the shots. In a seismic survey, a source may be fired at time equal to t1 as represented by the spike at shot 1. The receivers may begin recording a seismic wave 10 in response to shot 1 at time, t2, after the shot is fired. This seismic wave 10 may attenuate, or get smaller over time. At some time, t3, the next acquisition source may be fired as represented by the spike at shot 2. The receivers may begin recording a seismic wave 20 in response to shot 2 at time t4. However, at time t4, the receivers may still be recording a portion of seismic wave 10 that still resonates from the previous shot. This attenuating seismic wave 10 from the previous shot may be considered noise when evaluating the seismic wave field response 20 from the second shot, the shot of interest, and may be referred to as the residual shot noise. The portion of the seismic wave that contains desirable information may be termed the signal. Noise is the undesirable information that typically accompanies the signal.

FIG. 10 illustrates a flow diagram of a method 1000 for reducing residual shot noise during seismic data processing in accordance with implementations of various techniques described herein. Various implementations may require that the firing time for each shot be recorded with accuracy on the order of milliseconds. FIGS. 11A-F illustrate the methodology illustrated in FIG. 10 using an attenuating wave to depict the seismic data recorded in response to each shot. FIG. 11A illustrates a simplified example of seismic data in response to shots 98, 99 and 100. At step 1010, the seismic data may be separated into shot records by synchronizing the seismic data with reference to the firing time of each shot at time equal to zero. For instance, the shot record for shot 100 contains the seismic data in response to shot 100 and begins at the time shot 100 was fired and continues for the duration of interest, typically 6 seconds or less. FIG. 11B illustrates a simplified example of the synchronized seismic data for shot 100 with time equal to zero at the firing time of shot 100, represented by the spike. Although the duration of interest is described herein as typically being 6 seconds or less, it should be understood that in some implementations the duration of interest may be less than 6 seconds, such as from about 2 seconds to about 6 seconds, or greater than 6 seconds, such as from about 6 seconds to about 10 seconds. In one implementation, a lateral coherence filter may be applied to the seismic data for each shot to enhance the seismic image for the shot. The lateral coherence filter may be applied in the common offset domain.

At step 1020, the seismic data may again be synchronized, but now with reference to the firing time of the previous shot at time equal to zero. Here, the seismic record will be expanded over a longer period of time, i.e., the time from the previous shot through the duration of interest of the shot of interest. FIG. 11C illustrates a simplified example of the seismic data for shot 100 synchronized with reference to the previous shot's 99 firing time. At step 1030, a lateral coherence filter may be applied to the seismic data for each shot to enhance the seismic image for the shot. Again, a lateral coherence filter in the common offset domain may be applied. In this manner, the response due to the previous shot may be enhanced and the response due to the shot of interest may be minimized. FIG. 11D illustrates the result of applying the lateral coherence filter to the seismic data for shot 100 having been referenced to the firing time of shot 99. The signal from shot 100 may be removed by the filter as incoherent noise while the signal from shot 99 may be retained as a coherent signal. It may be noted that this process reverses the goal of isolating shot 100, the shot of interest, in order to more effectively remove the noise, shot 99, in step 1050 below.

Since the response due to the previous shot 99 may be considered residual shot noise with respect to the seismic data of shot 100, which is the shot of interest, the residual shot noise affecting the shot of interest may be isolated. Accordingly, at step 1040, the seismic data from step 1030, the isolated residual shot noise, may be resynchronized again with reference to the shot of interest's firing time. In effect, the portion of the residual shot noise that occurs after the shot of interest has been fired will be selected, as illustrated in FIG. 11E. At step 1050, the residual shot noise data from step 1040 (FIG. 11E) may be subtracted from the original synchronized data from step 1010 (FIG. 11B) leaving a noise-reduced record for the shot of interest as illustrated in FIG. 11F. At step 1060, the noise-reduced data may be processed to produce the seismic image.

In one implementation, a typical marine seismic survey may be performed to acquire the seismic data. The firing times may be recorded accurately for use in processing. The seismic data may then be processed using the method described in FIG. 10.

In another implementation, the removal of residual shot noise may be further enhanced by using pre-defined shot times, in addition to pre-defined shot positions. While the shot times may be at regular time intervals such as every 6s, the shot times may be selected such that coherency may be enhanced. In general, coherency filters may perform better with time intervals between shots that are different, but defined. For example, the time interval between shots may be gradually increased by a few milliseconds per shot such that the residual shot noise would appear as data with a defined and non-zero move-out. In one implementation, the time intervals may be as follows: 6s, 6s+4 ms, 6s+8 ms and so on. The residual shot noise may therefore have a different slope than the signal of interest. Any method for varying the timing of shots may be employed, including increasing or decreasing the time interval between shots and the like. Although seismic surveys are typically performed with pre-defined shot positions, some surveys are conducted with pre-defined shot times.

However, no method is currently employed that pre-defines both shot position and shot time. To accomplish a marine seismic survey in which the time and location of shots may both be controlled, it may be necessary to tightly control the speed of the vessel towing the streamers of receivers. The sources may be fired at precisely the correct times and the vessel speed may be adjusted such that the shot positions match the pre-defined shot positions within a tolerance of approximately 2.5 meters of the planned position. The control system that constrains the shot position may control the vessel speed. The distance between shots may be proportional to the average speed of the vessel during the shot time interval. If, for example, the shot points were found to be falling progressively further ahead of the nominal positions, the vessel speed may be reduced. The seismic data collected may then be processed using the method described in FIG. 10.

The method of FIG. 10 may be used to separate residual shot noise from the signal. If the residual shot noise may be removed or reduced, the time between shots may be reduced from the typical 10 second interval. The time between shots may be shortened to the duration of interest, typically approximately 6 seconds. If the separation of residual shot noise is highly effective, the time between shots may be even shorter such that the durations of interest may overlap. Shortening the time between shots may result in smaller distances between shots, increased image resolution, reduced time for survey completion and the like.

FIG. 12 illustrates a method for generating a time-lapse difference image in accordance with implementations of various techniques described herein. In a time-lapse seismic survey, a repeat survey may be performed in the same location as a previous baseline survey for the purpose of comparing the images produced by the two surveys. The images may be subtracted to create the time-lapse difference image. A time-lapse difference image represents any change to the subsurface layers since the last survey was performed. For example, the difference in image may reveal the places in which the oil-and-water contact has moved indicating the areas from which oil has been pumped. If the oil-and-water contact is not changing in all expected areas of the reservoir, another well may be installed to tap into that area. Using current methods, residual shot noise may contribute to the background noise of the time-lapse difference image because the residual shot noise may not be coherent between the two surveys. At step 1210, a baseline seismic survey may be performed in which the shot times are accurately recorded. The baseline survey may be conducted with any varying time intervals between shots, whether constant, increasing, decreasing and the like, as described in the above paragraphs. At step 1220, after some period of time, a repeat survey may be performed using the same shot times to an accuracy of less than 4 ms, and approximately the same shot positions. The repeat shot positions may be within approximately 2.5 meters of the baseline shot positions. At step 1230, the seismic data from the two surveys may be processed. The seismic data may be processed by any method as long as both sets of seismic data are processed in the same manner. At step 1240, the resulting images from each survey may be subtracted and the difference in the surveys represents the change over time. Since the residual shot noise from both surveys should be very similar, the majority will subtract or cancel out. Therefore the residual shot noise in the resultant time-lapse difference image may be significantly reduced.

FIG. 13 illustrates a method for acquiring and processing seismic data using orthogonal sequences to reduce residual shot noise. At step 1310, at least two mutually orthogonal sequences may be selected. At step 1320, a seismic survey may be performed using the orthogonal sequences on alternate shots. For example, shot 99 may be fired in accordance with orthogonal sequence A; then shot 100 may be fired with orthogonal sequence B. Shot 101 may then be fired with sequence A and so on. At step 1330, the response to each shot may be separated from the residual shot noise resulting from the previous shot by decoding the responses in accordance with implementations of various technologies described herein. For example, the shot record for shot 100 may be correlated with the orthogonal sequences A and B to isolate the signal from shot 100 and the noise from shot 99. At step 1340, the noise reduced signal data may be processed to produce a seismic image. While two orthogonal sequences were used in this illustration, more orthogonal sequences may be utilized.

In another implementation, the methods described in FIGS. 10 and 13 may be combined. For example, orthogonal sequences may be used in addition to constraining the shot times and shot positions. In this manner, the data acquired may be separated using the orthogonal sequences. Then, the method described in FIG. 10 may be used to further reduce the residual shot noise in the seismic data.

Figure 14:
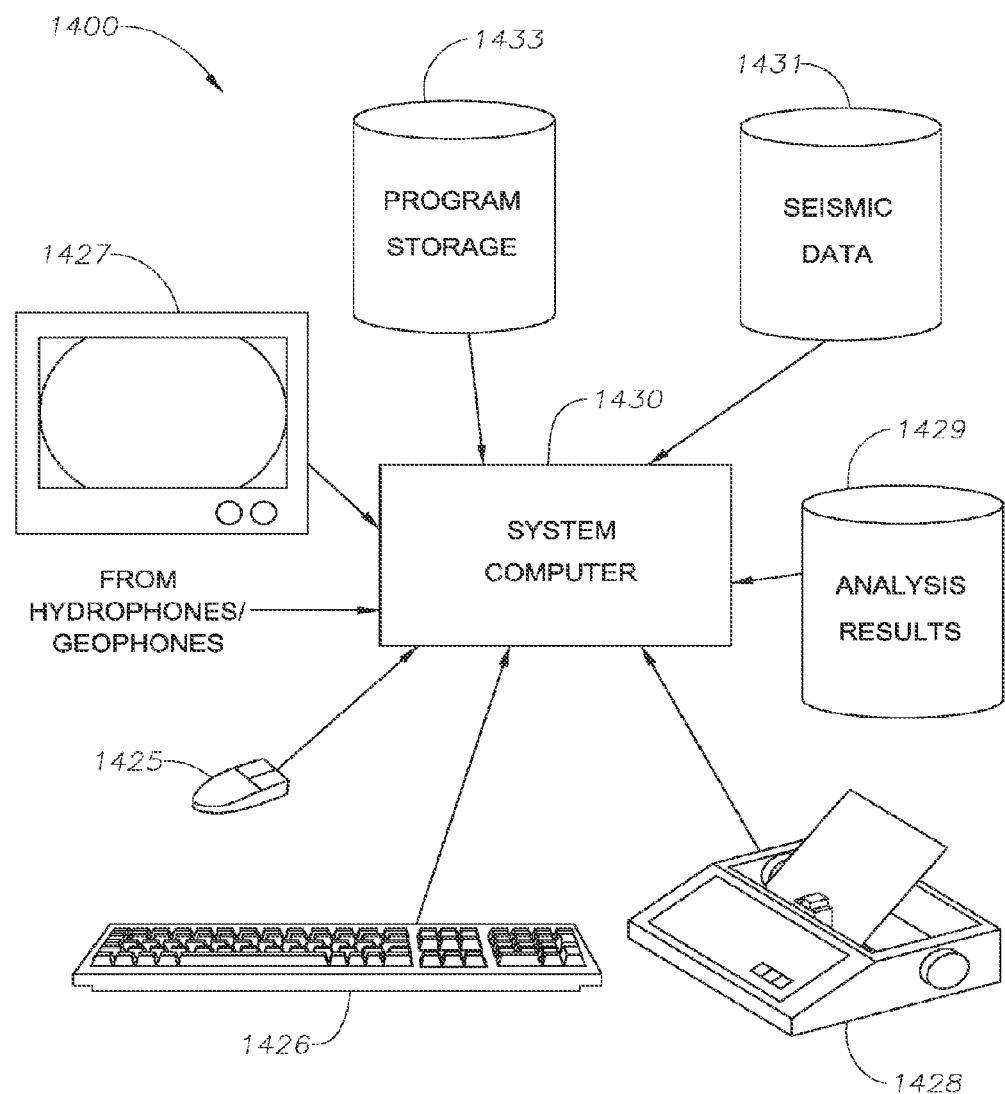
FIG. 14 illustrates a computer network, into which implementations of various technologies described herein may be implemented.

FIG. 14 illustrates a computer network 1400, into which implementations of various technologies described herein may be implemented. The computer network 1400 may include a system computer 1430, which may be implemented as any conventional personal computer or server. However, those skilled in the art will appreciate that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, and the like.

The system computer 1430 may be in communication with disk storage devices 1429, 1431, and 1433, which may be external hard disk storage devices. It is contemplated that disk storage devices 1429, 1431, and 1433 are conventional hard disk drives, and as such, will be implemented by way of a local area network or by remote access. Of course, while disk storage devices 1429, 1431 and 1433 are illustrated as separate devices, a single disk storage device may be used to store any and all of the program instructions, measurement data and results as desired.

In one implementation, seismic data from the receivers may be stored in disk storage device 1431. The system computer 1430 may retrieve the appropriate data from the disk storage device 1431 to process seismic data according to program instructions that correspond to implementations of various technologies described herein. The program instructions may be written in a computer programming language, such as C++, Java and the like. The program instructions may be stored in a computer-readable medium, such as program disk storage device 1433. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 1430 may present output primarily onto graphics display 1427, or alternatively via printer 1428. The system computer 1430 may store the results of the methods described above on disk storage 1429, for later use and further analysis. The keyboard 1426 and the pointing device (e.g., a mouse, trackball or the like) 1425 may be provided with the system computer 1430 to enable interactive operation.

The system computer 1430 may be located at a data center remote from the survey region. The system computer 1430 may be in communication with the receivers (either directly or via a recording unit, not shown), to receive signals indicative of the reflected seismic energy. These signals, after conventional formatting and other initial processing, may be stored by the system computer 1430 as digital data in the disk storage 1431 for subsequent retrieval and processing in the manner described above. While FIG. 14 illustrates the disk storage 1431 as directly connected to the system computer 1430, it is also contemplated that the disk storage device 1431 may be accessible through a local area network or by remote access. Furthermore, while disk storage devices 1429, 1431 are illustrated as separate devices for storing input seismic data and analysis results, the disk storage devices 1429, 1431 may be implemented within a single disk drive (either together with or separately from program disk storage device 1433), or in any other conventional manner as will be fully understood by one of skill in the art having reference to this specification.

Although the various technologies described herein where discussed in reference to marine seismic surveys, the various technologies described herein may also be applicable to land seismic survey, sea-bed seismic survey or others, where dipole or multi-pole data may be acquired.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for acquiring and processing seismic data, comprising:
   deploying at least two marine seismic sources in a body of water at substantially the same longitudinal position from a vessel;
   activating the at least two marine seismic sources in a plurality of firing sequences during a seismic survey, at least one firing sequence having a different time delay between the firing of the seismic source and the start of the seismic recording; and
   recording the seismic data in response to activating the at least two marine seismic sources.

2. The method of claim 1, wherein the time delay for the at least one firing sequence is variable.

3. The method of claim 1, wherein the time delay for the at least one firing sequence is constant.

4. The method of claim 1, wherein the time delay for the at least one firing sequence increases over time.

5. The method of claim 1, wherein the time delay for the at least one firing sequence decreases over time.

6. The method of claim 1, further comprising synchronizing the recorded seismic data with reference to the firing time of each shot.

7. The method of claim 1, further comprising applying a lateral coherence filter to the recorded seismic data for each shot.

8. The method of claim 1, wherein the at least two marine seismic sources are deployed at different depths.

9. The method of claim 1, wherein the at least two marine seismic sources are deployed at substantially the same depth and are laterally offset from one another.

10. A method for acquiring and processing seismic data, comprising:
- deploying first and second marine seismic sources in a body of water at substantially the same longitudinal position from a vessel;
- activating the first and second marine seismic sources, wherein the second marine seismic source has a firing sequence with a time delay in respect to a firing sequence of the first marine seismic source; and
- recording the seismic data in response to activating the first and second marine seismic sources.

* * * * *